May 1, 1928.
J. L. MESPLÉ
1,668,121
FOUR-WHEEL BRAKE EQUALIZER
Original Filed May 27, 1924
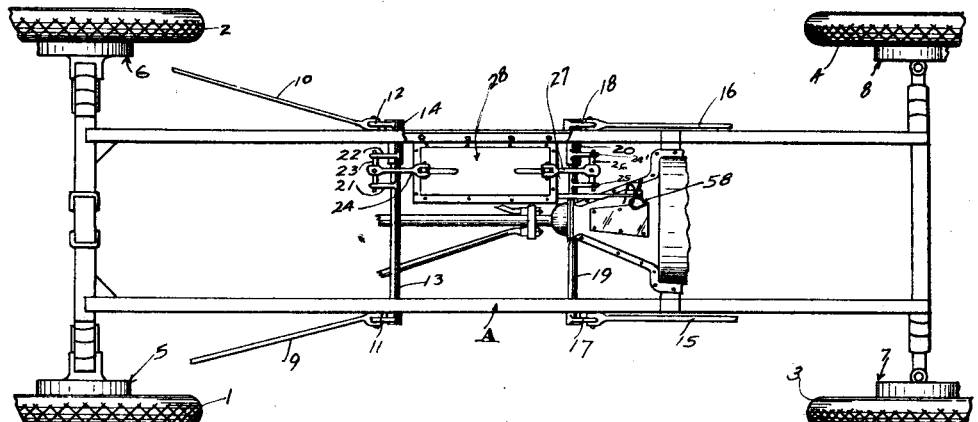
Fig. I
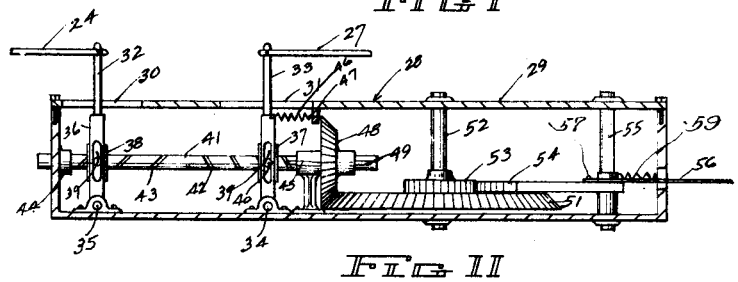
Fig. II
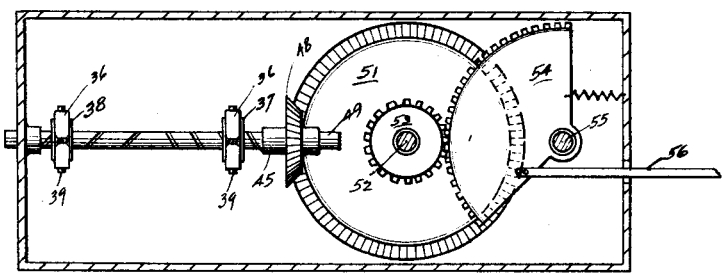
Fig. III
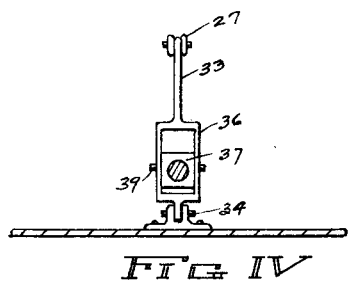
Fig. IV
INVENTOR
J. L. MESPLÉ
BY
ATTYS Patented May 1, 1928.

1,668,121

UNITED STATES PATENT OFFICE.

JOHN L. MESPLÉ, OF SAN FRANCISCO, CALIFORNIA.

FOUR-WHEEL-BRAKE EQUALIZER.

Application filed May 27, 1924, Serial No. 716,183. Renewed May 3, 1926.

The present invention relates to improvements in four wheel brake apparatus for motor vehicles and more particularly to an equalizer for such brake apparatus.

One of the objects of the invention is to provide a brake equalizer for the present popular style of four wheel brake apparatus, which equalizer is of simple, inexpensive and compact construction and provides for an effective and reliable application of the braking force to the brakes under all conditions of use of the latter, the equalizer acting to provide a predetermined proportionate distribution of the braking forces applied to each of the wheels of the front and rear sets.

Another object of the invention is to provide a four wheel brake equalizer of the character described which will act to cause the rear wheels to be operated before the front brakes are actuated and to then evenly bring about an application of the braking force on the four wheels.

The invention contemplates the provision of braking apparatus for four wheel brakes which will bring about a smoother, more even and effective braking action on the four wheels and automatically adjust itself to provide an equal braking action to the wheels regardless of conditions of wear of the brakes or other irregularities in the braking apparatus.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a fragmentary top plan view of an automobile frame showing the brake apparatus of my invention as applied thereto.

Fig. 2 represents an enlarged vertical sectional view of the equalizing apparatus of my invention.

Fig. 3 represents a horizontal sectional view of the equalizing apparatus shown in Fig. 1.

Fig. 4 represents an enlarged elevation partly in section of a detail of the equalizing mechanism.

In carrying out this invention I provide a simple, effective and reliable means of operative connection between the ordinary brake pedal and the brakes which are associated with the four wheels of the vehicle, which means will automatically adjust itself to compensate for irregularities in the individual brakes and thereby equalize the braking force so that the braking action will not be greater on one wheel than on any of the others.

To insure a safe and effective action on the four wheels the equalizing mechanism is arranged to bring about the braking of the rear wheels first and then cause an equal braking of the four wheels. This equalizing action may be accomplished in various ways, taking into consideration in each instance however, the provision of a movable force applying means which is driven from the operating mechanism controlled by the brake pedal. This movable means provides in effect, the application of the braking force to the four brakes from a common driven element so that the force will be equalized at the several brakes. In the present embodiment I provide a bodily movable rotary shaft in combination with levers, which are moved to apply the braking force to the brakes both upon rotation and upon bodily movement of said shaft.

In the embodiment of the invention shown in the accompanying drawings, A designates the frame or chassis of an automobile having rear wheels 1 and 2 and front wheels 3 and 4. On the rear wheels are the usual brakes generally designated 5 and 6, and on the front wheels are front wheel brakes designated 7 and 8. The brakes 5 and 6 have rods 9 and 10 connected therewith and with the crank arms 11 and 12, carried on the outer ends of shafts 13 and 14, which latter are journaled in the frame A, and may be telescopically fitted as shown, but which are relatively movable. The front wheel brakes are operated by similar rods 15 and 16, which are connected with crank arms 17 and 18, carried on shafts 19 and 20, which latter are arranged as are the shafts 13 and 14 with respect to the frame A. The shafts 13 and 14 are provided adjacent their inner ends with crank arms 21 and 22 joined by a beam 23. A link 24 is connected at one end with the beam 23 and at the other end is connected with the equalizing and operating mechanism, which will be later more fully described. The shafts for the front wheel brakes have crank arms 24' and 25 thereon joined by a beam 26 to which beam a link 27 is connected. This arrangement is the same as for the rear wheel brakes, the force for both brakes being applied through the links. By having the shafts 12 and 13 and those designated 19 and 20 relatively movable, the force will be evenly applied in case any irregularity exists in the brakes.

The equalizing and operating mechanism is generally designated 28 and comprises a casing 29 suitably mounted on the frame of the vehicle. The upper wall of this casing is provided with longitudinal slots or openings 30 and 31 through which levers 32 and 33 extend into said casing, the upper ends of the levers being pivoted to links 24 and 27 respectively. The lower ends of the levers are pivoted as at 34 and 35 to the bottom wall of the casing. The levers are provided intermediate of their ends with rectangular frame portions 36 and in these frame portions nuts 37 and 38 are mounted, the sides of the frames 36 being longitudinally slotted as at 39. These slots receive pins 40 carried by the nuts. Extending through the nuts 37 and 38 is a rotatable and longitudinally shiftable shaft 41 having oppositely turned sets of screw threads 42 and 43 extending from its ends. This shaft is slidably and rotatably journaled in bearings 44 and 45 provided in the casing. The nuts 37 and 38 have threads or projections which engage in the screw threads 42 and 43. The screw threads 43 are cut so as to advance the nut 38 faster than the nut 37 is advanced, both sets of threads being arranged to cause the nuts to move toward and away from one another on rotation of the shaft in either of two directions, the movement of the nuts towards one another causing the levers 32 and 33 to be correspondingly rocked towards one another and to pull on the links 24 and 27 so that a braking force is applied to the brakes of the front and rear wheels.

As a means for insuring the application of the braking force to the rear wheels first, I provide a retractile spring 46 connected at its ends to the lever 33 and a lug 47 disposed within the casing. This spring at all times exerts a tension on the lever 33 so as to move it in the opposite direction to that which would cause a braking force to be applied to the rear wheels. The spring also acts to resist movement of the shaft 41 bodily in a direction such as would equalize the application of the braking force.

As a means for rotating the shaft, a bevel gear 48 is mounted thereon so that the shaft is free to slide as well as rotate, there being a key-way 49 in the shaft for a key carried by the gear. One side of this gear engages the bearing 45 and the other side engages and meshes with a drive gear 51, which latter is fixed to a shaft 52 suitably journaled in the casing. A smaller gear 53 is fixed to the shaft 52 and is enmeshed with a toothed quadrant 54 rotatably mounted on a shaft 55. A link or rod 56 is pivoted as at 57 to the segment and suitably connected with the brake pedal 58 so that when the pedal is depressed the equalizer will be rocked and rotate and the gears 53, 51 and 48, thereby causing the shaft 41 to rotate. This train of gears provides for the proper gear ratio in insure the necessary movement of the parts on actuation of the foot pedal to bring about the proper operation of the brakes. A retractile spring 59 may be provided to return the parts to normal position, said spring being connected with the casing and segment respectively.

*Operation.*

When the foot pedal 58 is depressed to apply the brakes the force is applied through the segment 54 and train of gears associated therewith so that the shaft 41 rotates in a counter-clockwise direction and thereby causes the nuts 37 and 38 to move towards one another. Movement of these nuts towards one another rocks the levers 32 and 33 towards one another and pulls on the links 24 and 27. When the links 27 are thus pulled, the shafts 13, 14 and 19 and 20 are turned so that the brake rods 9, 10, 15 and 16 are pulled and cause the front and rear wheel brakes to be actuated. The threads 43 are such that the nut 38 will move faster than the nut 37 and this will cause an operation of the rear wheel brakes before the front wheel brakes are actuated to an appreciable extent. The operation of the rear wheel brakes first is desirable and a safety factor. The fact that the rear wheel brakes operate first causes a resistance to the force applied through the shaft 41 in such a manner that the shaft 41 tends to be moved bodily but the spring 46 resists this movement of the shaft so that the equalizing action will not be too readily brought about. This spring also combines with the actuating force to bring about and insure operation of the rear brakes and in this way insures initial operation of the rear brakes. When force is being applied to both sets of brakes, a predetermined proportional distribution of the respective forces will be maintained, that is, a given proportionality will always be maintained between the respective forces applied by the levers 33 and 32 for a given moment applied to rotate the shaft 41. Since this shaft is longitudinally slidable this proportionality will be maintained irrespective of the distances traveled by levers 33 and 32 to apply the desired predetermined braking forces. In this way compensation is made for irregularities in the adjustments of the front and rear sets of brakes.

The apparatus of this invention will bring about a smooth, even and safe operation of the brakes under all conditions of service and regardless of irregularities in the sets of brakes or individual brakes. The brakes and apparatus will wear evenly and last longer as a result of the use of the apparatus of this invention and all danger of locking of the brakes, any one or all of them is prevented. The apparatus of the invention is of simple, compact construction and such that it may be readily installed in conjunction with modern types of brake apparatus without necessitating materially changing the construction of such apparatus.

I claim:

1. The combination with a vehicle having front and rear wheels and brake mechanisms for each wheel, of an operating lever, a rotating longitudinally shiftable shaft, means for operatively connecting the operating lever and shaft for causing rotation of the shaft on movement of the lever, and means for operatively connecting the brake mechanisms and the shaft acting to apply a braking force to the brakes on rotation of the shaft in one direction.

2. The combination with a vehicle having front and rear wheels and brake mechanisms for each wheel, of an operating lever, a rotating longitudinally shiftable shaft, a casing in which the shaft is supported, means of operative connection between the operating lever and shaft providing for rotation of the shaft on movement of the lever, means for operatively connecting the brake mechanisms and the shaft acting to apply a braking force to the brakes on rotation of the shaft in one direction and means acting to resist the shifting movement of the shaft in one direction.

3. The combination with a vehicle having front and rear wheels and brake mechanisms for each wheel, of an operating lever, a rotating longitudinally shiftable shaft, a casing in which the shaft is supported, means for operatively connecting the operating lever and shaft providing for rotation of the shaft on movement of the lever and means for operatively connecting the brake mechanisms and the shaft acting to apply a braking force to the brakes on rotation of the shaft in one direction, which means causes the braking force to be applied to the rear wheels first and then applies the force to each of the brake mechanisms.

4. The combination with a vehicle having front and rear wheels with brake mechanisms on said wheels, of an operating lever, a rotary bodily movable shaft having right and left hand screw threads thereon, nuts on the shafts co-operating with the threads adapted to move relative to each other on rotation of the shaft, levers operatively connected to said nuts, means for operatively connecting the shaft and said operating lever providing for rotation of the shaft in either of two directions on movement of the lever, and means for operatively connecting said levers and the brake mechanisms for applying and releasing the brakes on movement of said levers.

5. The combination with a vehicle having front and rear wheels and brake mechanisms for each wheel, of an operating lever, a rotating longitudinally shiftable shaft, a casing in which the shaft is supported, means for operatively connecting the operating lever and shaft providing for rotation of the shaft on movement of the lever, means for operatively connecting said pivoted levers and the brake mechanisms for applying and releasing the brakes on movement of said levers and spring means for returning the shaft and said means to normal position.

6. The combination with a vehicle having front and rear wheels and brake mechanisms for each wheel, of an operating lever, a rotating longitudinally shiftable shaft, a casing in which the shaft is supported, means for operatively connecting the operating lever and shaft providing for rotation of the shaft on movement of the lever, means for operatively connecting said pivoted levers and the brake mechanisms for applying and releasing the brakes on movement of said levers and spring means for returning the shaft and said means to normal position, said shaft having one of the sets of screw threads pitched to advance one nut faster than the other to cause actuation of the rear wheel brakes before actuation of the front wheel brakes.

7. The combination of a vehicle having front and rear wheels and a brake for each of the wheels, of an operating lever on the vehicle, a bodily movable revolvable member, means for operatively connecting said member and said operating lever revolving said member on movement of the lever, and means for operatively connecting the brakes and said member which when the member is revolved in one direction will apply a braking force to said brakes first to the rear wheel brakes and then to all of said brakes.

8. The combination of a vehicle having front and rear wheels and a brake for each of the wheels, of an operating lever on the vehicle, a bodily movable revolvable member, means of operative connection between said member and said operating lever revolving said member on movement of the lever, and means for operatively connecting the brakes and said member which when the member is revolved will apply a braking force to said brakes first to the rear wheel brakes and then to all of said brakes, which means includes levers mounted to rock on rotation and on bodily movement of said member and rods having connection with said levers and brakes.

9. The combination with a vehicle having front and rear sets of brakes, an operating lever, a rotatable bodily shiftable member, a casing in which said member is supported, means for operatively connecting the operating lever and said member for causing rotation of said member on movement of the lever, and means for operatively connecting the front and rear sets of brakes and said member acting to apply a braking force to said brake sets on rotation of said member in one direction.

10. The combination with a vehicle having front and rear sets of brakes, an operating lever, a rotatable bodily shiftable member, means for operatively connecting the operating lever and said member for applying force to said member to rotate the same upon movement of the lever, means operatively connecting said member and said rear set of brakes, said last named means including means for equalizing forces applied to the individual brakes of said rear set, means operatively connecting said member and said front set of brakes, said last named means including means for equalizing the forces applied to the individual brakes of the front set, and means independent of said sets of brakes for effecting application of one set prior to application of the other set.

JOHN L. MESPLÉ.